United States Patent [19]
Davis

[11] Patent No.: US 6,292,892 B1
[45] Date of Patent: Sep. 18, 2001

US006292892B1

(54) APPARATUS AND METHOD FOR PROVIDING SECURED COMMUNICATIONS

(75) Inventor: Derek L. Davis, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/526,301

(22) Filed: Mar. 15, 2000

Related U.S. Application Data

(63) Continuation of application No. 09/096,714, filed on Jun. 12, 1998, which is a continuation of application No. 08/538,869, filed on Oct. 4, 1995, now Pat. No. 5,796,840, which is a division of application No. 08/251,486, filed on May 31, 1994, now Pat. No. 5,539,838.

(51) Int. Cl.$^7$ ............................................. G06F 1/24
(52) U.S. Cl. .................... 713/156; 713/159; 713/168; 713/169; 380/255; 380/258; 380/277
(58) Field of Search .................................. 713/155, 156, 713/159, 168, 169, 175, 185, 193; 380/255, 258, 277

(56) References Cited

U.S. PATENT DOCUMENTS 5,201,000   4/1993   Matyas et al. .

FOREIGN PATENT DOCUMENTS 0 624 014    11/1994  (EP) .
WO 90/02456   3/1990  (WO) .

OTHER PUBLICATIONS

"The Directory—Authentication Framework". 33 pages; Melbourne, 1998.
Lemcom Systems Inc. "ViaCrypt DigiSig plus DES". 2 pages.
Dallas Semiconductor. "Product Data Book: 1992–1993". 7 pages.
Proceedings: "4th Annual Symposium on Cryptographic Security for Data Processing and Data Communications". Nov. 11–15, 1991. 24 pages.
European Committee for Standardization. "European Standard. Inter–sector Electronic Purse Part 1: Concepts and Structures", 16 pages, 1992.
Blum, L., Blum, M. and Shub, M. A Simple Unpredictable Pseudo–Random Number Generator. Siam J. Comput., vol. 15, No. 2, 20 pages, May 1986.
SGS–Thomson Microelectronics. "CMOS Crypto–Computer Family". Apr. 1993. 30 pages.
Motorolla. "HC11: M68HC11 Reference Manual". Revision 3, 1991.
Motorolla. "Microprocessor, Microcontroller and Peripheral Data".
Philips Semiconductors. "CMOS single–chip 8–bit microcontroller with on–chip EEPROM". Nov. 25, 1992.
Intel. "Memory Products". 3 pages. 1992.
Amtel Corporation. "CMOS Integrated Circuit Data Book". 1993–1994. 3 pages.
Philips. "9XC1XX: Philips 16/32–bit microcontroller series". Feb. 1991. 4 pages.
IEEE Communications Magazine, vol. 29, No. 6, Jun. 1991 US, pp. 42–48, H.P. Konigs, "Cryptographic Identification Methods for Smart Cards in the Process of Standardization".

Primary Examiner—Thomas R. Peeso
(74) Attorney, Agent, or Firm—Blakely, Sokoloff, Taylor & Zafman LLP

(57) ABSTRACT

In one embodiment, a method to provide reliable electronic distribution of information between a first system and a second system remotely located from the first system coupled together by a communication link. The method comprises storing a public key, a private key, and signed key parameters in a semiconductor device associated with the first system. The signed key parameters are output from the semiconductor device to the second system via the communication link. Then, the first system is authenticated by the second system; and the information is transmitted from the second system to the first system, provided the first system is authenticated.

27 Claims, 8 Drawing Sheets

APPARATUS AND METHOD FOR PROVIDING SECURED COMMUNICATIONS

This is a continuation application of application Ser. No. 09/096,714, filed Jun. 12, 1998, which is a continuation of Divisional application Ser. No. 08/538,869, filed Oct. 4, 1995, now U.S. Pat. No. 5,796,840, issued Aug. 18, 1998, which is a divisional of application Ser. No. 08/251,486, filed May 31, 1994, now U.S. Pat. No. 5,539,838, issued Jul. 23, 1996.

BACKGROUND OF THE INVENTION

1. Field of the Invention

The present invention relates to the field of data security. More particularity, the present invention relates to a cryptographic semiconductor device storing encryption/decryption keys at manufacture and/or subsequent to manufacture to ensure secured communications between a system incorporating the semiconductor device and a device in remote communications with the system.

2. Art Related to the Invention

In today's society, it is becoming more and more desirable to transmit digital information from one location to another in a manner which is clear and unambiguous to a legitimate receiver, but incomprehensible to any illegitimate recipients. Accordingly, such information is typically encrypted by a software application executing some predetermined encryption algorithm and is transmitted to the legitimate receiver in encrypted form. The legitimate receiver then decrypts the transmitted information for use. This encryption/decryption transmission process is commonly used in governmental applications as well as for commercial applications where sensitive information is being transmitted.

Often, encryption/decryption of information is accomplished through symmetric key cryptography as shown in FIG. 1. In symmetric key cryptography, an identical key 1 (e.g., a data string commonly referred to as a "symmetric key") is used by both a legitimate sender 2 and a legitimate receiver 3 to encrypt and decrypt a message 4 (i.e., information) being transmitted between the sender 2 and receiver 3. Such encryption and decryption may be performed through well-known conventional algorithms such as RAS, DES, etc. and transmitted in encrypted form through a public domain 5 such as a conventional network, telephone lines, etc.

Although symmetric key cryptography is computationally simple, it requires complex key management. Basically, each sender needs a different symmetric key to communicate with each legitimate receiver, thereby making it difficult, if not impossible, to be used by businesses having a large number of employees. For example, in a business of 1000 legitimate entities (e.g., employees), a maximum of 499,500 (1000×999/2) keys would need to be managed, provided that each legitimate entity is capable of communicating with any another legitimate entity within the business. In addition, symmetric key cryptography is difficult to implement in a network or global environment because there is no secure and convenient way of transmitting the symmetric key from the legitimate sender 2 to the legitimate receiver 3.

Another method of encryption/decryption is to use two separate keys (referred to as a "key pair") in which a first key ("a public key") 10 of the key pair is used for encryption of a message 12 from a legitimate sender 13 while a second key ("a private key") 11 of the key pair is used by the legitimate receiver 14 for decryption of the message 12 as shown in FIG. 2. This method is commonly referred to as "asymmetric" (or public) key cryptography. One advantage of asymmetric key cryptography is that it alleviates the burdensome key management problem associated with symmetric key cryptography. Continuing the above example, the number of key pairs required for asymmetric key cryptography is equal to 1000, the total number of legitimate entities. However, in such communications system, it is known that an illegitimate entity (e.g., commercial spy) may attempt to impersonate a legitimate entity (e.g., employee, joint-venturer, etc.) by sending fraudulent messages to another legitimate entity for the purpose of disrupting work flow or obtaining confidential information. Thus, additional protocols are usually used in the asymmetric key system to ensure message and sender authentication.

Authentication of the sender (i.e., verifying that the sender of a public key is, in fact, the true owner of the public key) is a problem when communications are initially established between previously unknown parties. This problem is commonly avoided by incorporating a digital certificate 15 within the transmitted message 12 as shown in FIG. 3. The digital certificate 15 is issued by a mutually trusted authority 16 (e.g., a bank, governmental entity, trade association, etc.) so that fraudulent attempts to use another's public key 10 will simply result in unreadable messages. Such mutually trusted authority 16 depends on the parties involved. For example, two individuals employed by the same business could both trust the certificates issued by a corporate security office of the business. Employees of two independent business entities, however, would require not only the certificates from the respective security offices, but also the certificates from, for example, some industry trade organization that certifies such business entities. This digital certificate 16 methodology "binds" a public key 10 to an entity (e.g., employee).

In the past few years, there have been many approaches toward protecting "key" information from being obtained by unauthorized persons. One such approach is employing mechanical security mechanisms, particular for portable computers which can be more easily appropriated. For example, certain companies have introduced a "secure" laptop using a tamper-detection mechanism to erase the key material if the laptop's casing is opened without authorization. However, there are several disadvantages associated with mechanical security devices.

A primary disadvantage associated with mechanical security mechanisms is that they may be circumvented through reverse engineering. Another disadvantage is that mechanical security mechanisms are costly to design and fabricate. Another disadvantage is that they are subject to accidental erasure of key information.

As a result, a number of companies are simply relying on software applications to utilize encryption/decryption protocols. However, as technology rapidly evolves, these encryption/decryption software applications place unnecessary limitations on transmission speeds of a communication system since the speed of encrypting or decrypting information is correlated to the execution speed of the instructions.

This approach for employing specific hardware into the customer's system to protect such keys from disclosure is also used in the rapidly growing area of "content distribution", namely the electronic distribution of information. Some known content distribution systems include (i) selling software via modem or other electronic means and (ii) selling portion s of information distributed by compact disc ("CD"), etc. Such electronic sales often depend on the use of decryption keys to "decode" the specific data involved. For example, a customer may have free access to a CD containing many files of encrypted data, but to actually purchase a specific file, he buys the corresponding "decryption key" for that file. However, a primary problem with using specific hardware to protect the keys is that such hardware requires complete management and control by the information supplier to prevent any potential unauthorized uses.

BRIEF DESCRIPTION OF THE DRAWINGS

The features and advantages of the present invention will become apparent from the following detailed description of the present invention in which.

DETAILED DESCRIPTION OF THE INVENTION

The present invention relates to a cryptographic semiconductor device of many possible embodiments and its associated method of operation directed toward securely storing and using a public/private key pair and at least one digital certificate within the hardware agent itself. This digital certificate may include a "device certificate" being a digital certificate provided by a manufacturer of the device signifying the legitimacy of the device, and/or a "second level certificate" being a digital certificate from a trusted third party or a collection of both certificates. In the following description, numerous details are set forth such as certain components of the hardware agent in order to provide a thorough understanding of the present invention. It will be obvious, however, to one skilled in the art that these details are not required to practice the present invention. In other instances, well-known circuits, elements and the like are not set forth in detail in order to avoid unnecessarily obscuring the present invention.

Figure 1:
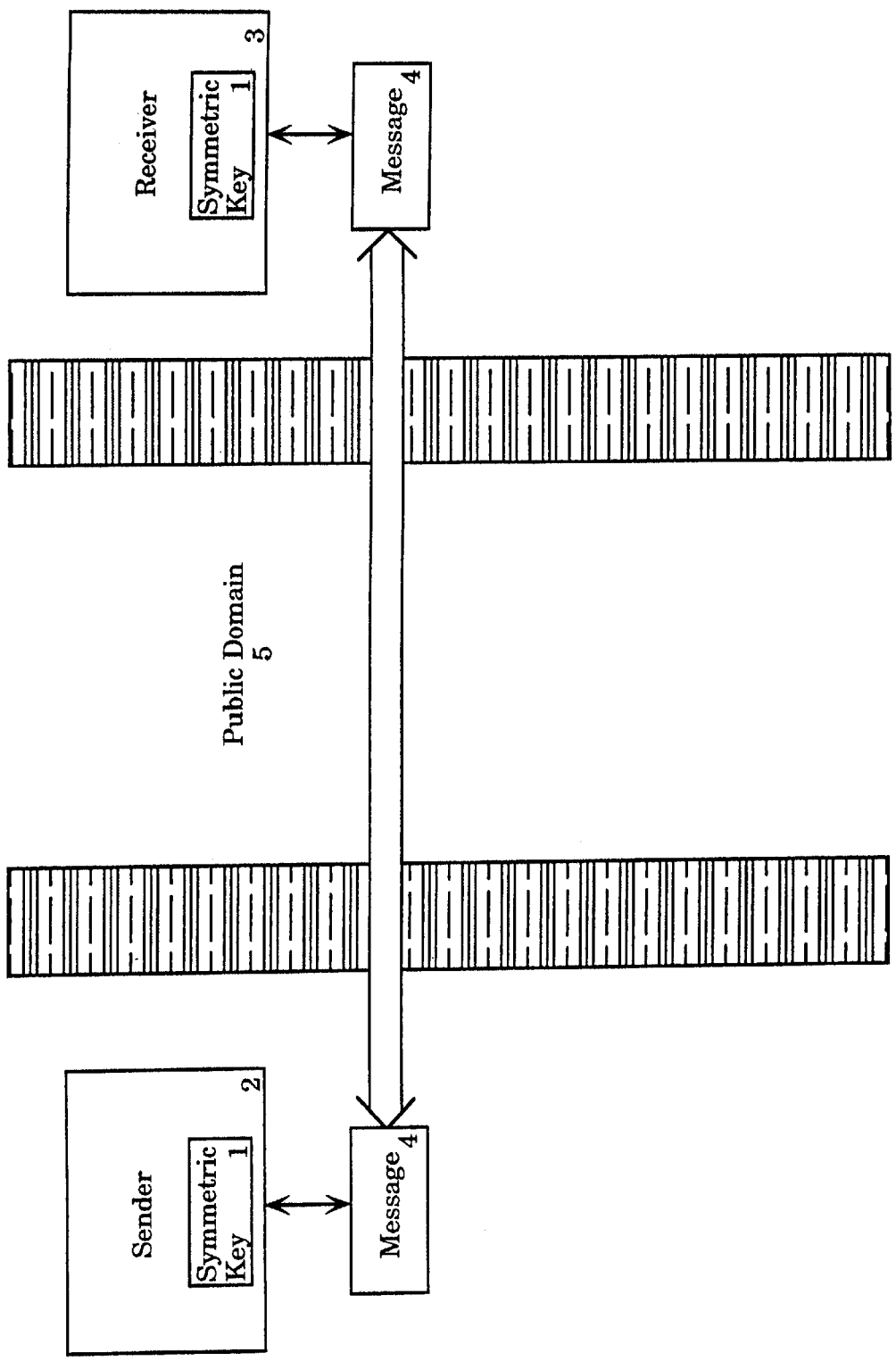
FIG. 1 is a block diagram illustrating a conventional symmetric key encryption and decryption process.
Figure 2:
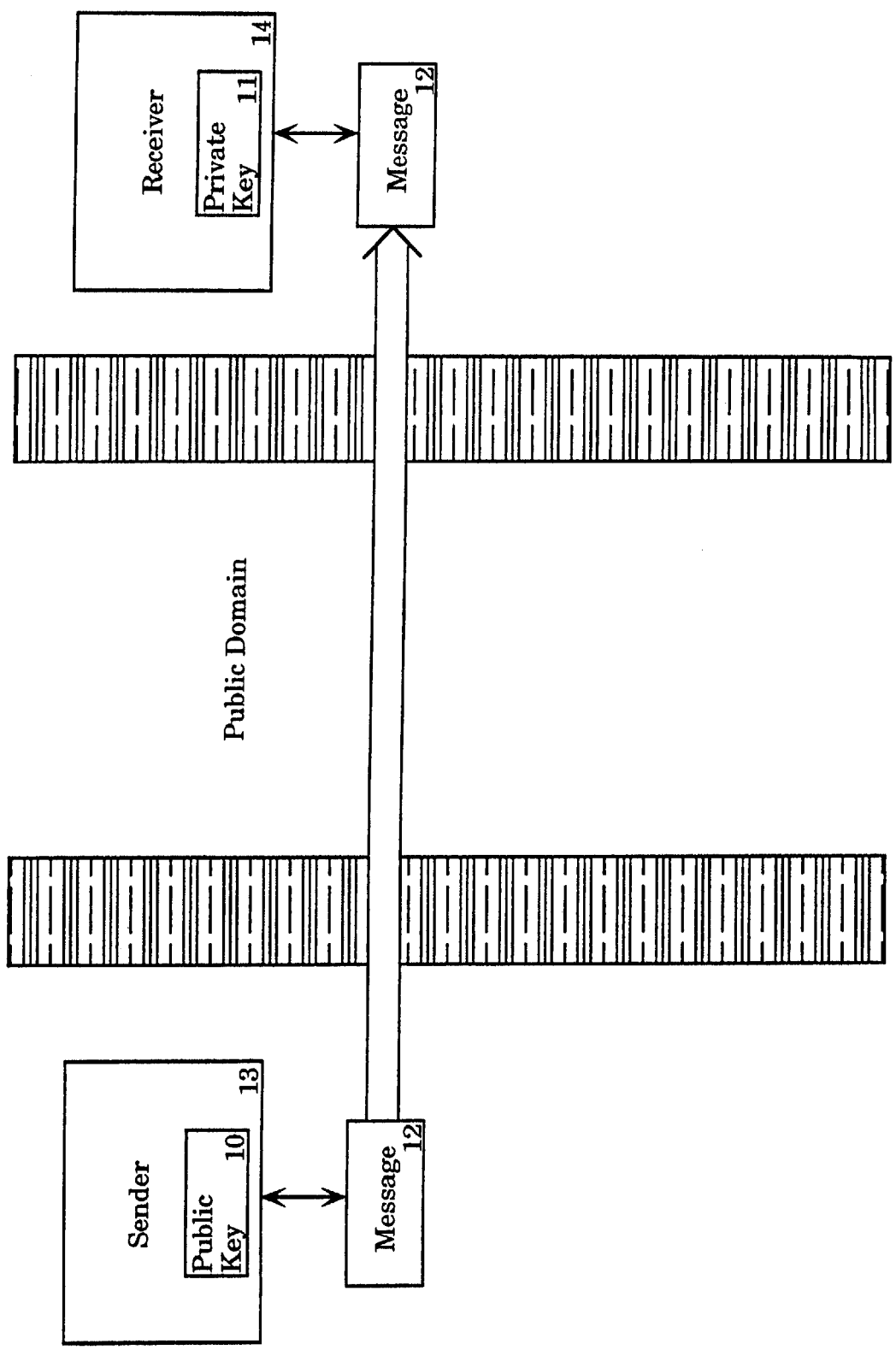
FIG. 2 is a block diagram illustrating a conventional asymmetric key encryption and decryption process.
Figure 3:
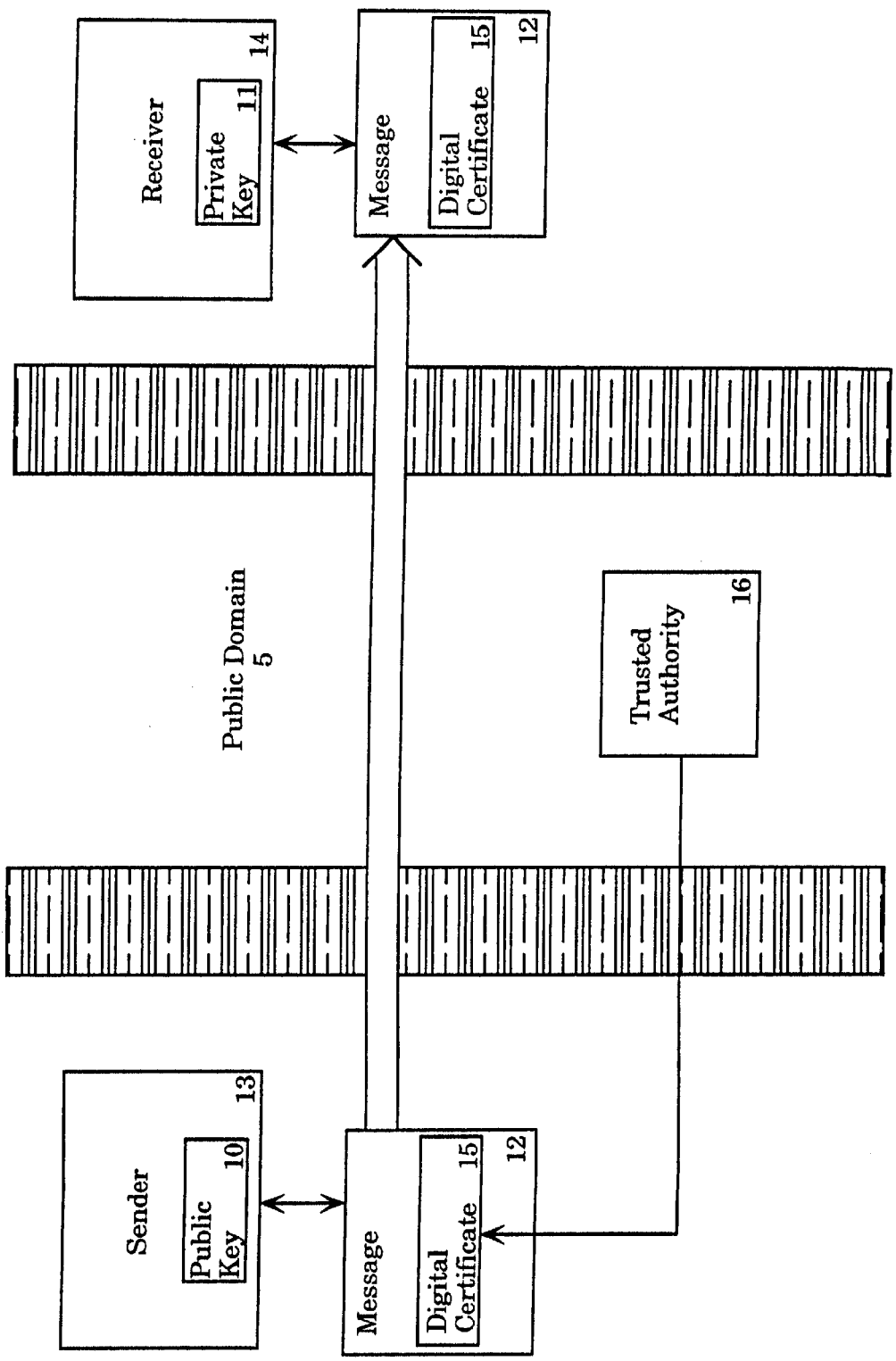
FIG. 3 is a block diagram illustrating a digital certification process from a trusted authority.
Figure 4:
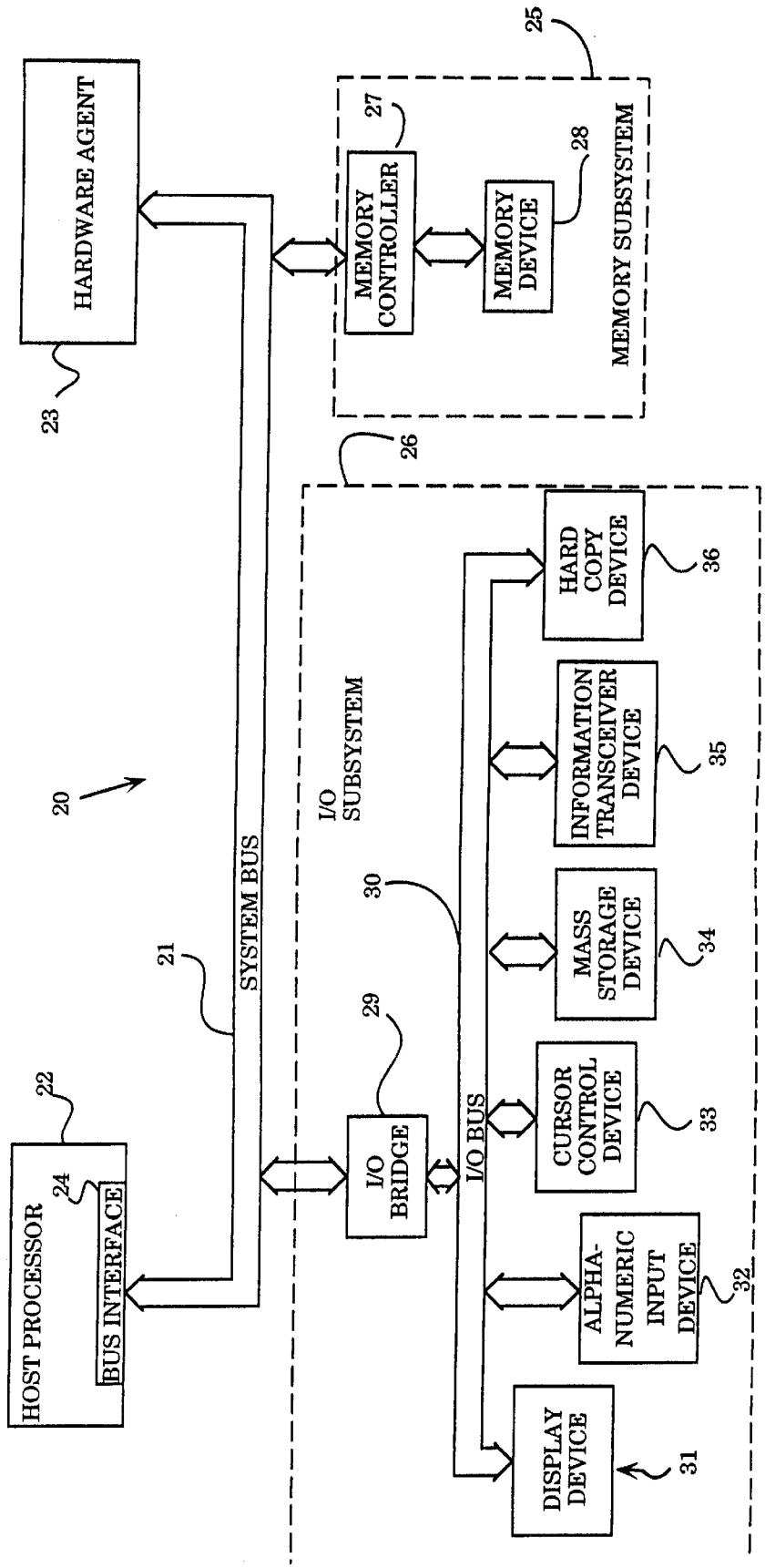
FIG. 4 is a block diagram of a computer system incorporating an embodiment of the present invention.

Referring to FIG. 4, an embodiment of a computer system 20 utilizing the present invention is illustrated. The computer system 20 comprises a system bus 21 enabling information to be communicated between a plurality of bus agents including at least one host processor 22 and a hardware agent 23. The host processor 22, preferably but not exclusively an Intel® Architecture Processor, is coupled to the system bus 21 through a processor bus interface 24. Although only the host processor 22 is illustrated in this embodiment, it is contemplated that multiple processors could be employed within the computer system 20.

As further shown in FIG. 4, the system bus 21 provides access to a memory subsystem 25 and an input/output ("I/O") subsystem 26. The memory subsystem 25 includes a memory controller 27 coupled to the system bus 21 to provide an interface for controlling access to at least one memory device 28 such as dynamic random access memory ("DRAM"), read only memory ("ROM"), video random access memory ("VRAM") and the like. The memory device 28 stores information and instructions for the host processor 22.

The I/O subsystem 26 includes an I/O controller 29 being coupled to the system bus 21 and a conventional I/O bus 30. The I/O controller 29 is an interface between the I/O bus 30 and the system bus 21 which provides a communication path (i.e., gateway) to allow devices on the system bus 21 and/or the I/O bus 30 to exchange information. The I/O bus 30 communicates information between at least one peripheral device in the computer system 20 including, but not limited to a display device 31 (e.g., cathode ray tube, liquid crystal display, etc.) for displaying images; an alphanumeric input device 32 (e.g., an alphanumeric keyboard, etc.) for communicating information and command selections to the host processor 22; a cursor control device 33 (e.g., a mouse, trackball, etc.) for controlling cursor movement; a mass data storage device 34 (e.g., magnetic tapes, hard disk drive, floppy disk drive, etc.) for storing information and instructions; an information transceiver device 35 (fax machine, modem, scanner etc.) for transmitting information from the computer system 20 to another device and for receiving information from another device; and a hard copy device 36 (e.g., plotter, printer, etc.) for providing a tangible, visual representation of the information. It is contemplated that the computer system shown in FIG. 4 may employ some or all of these components or different components than those illustrated.

Figure 5:
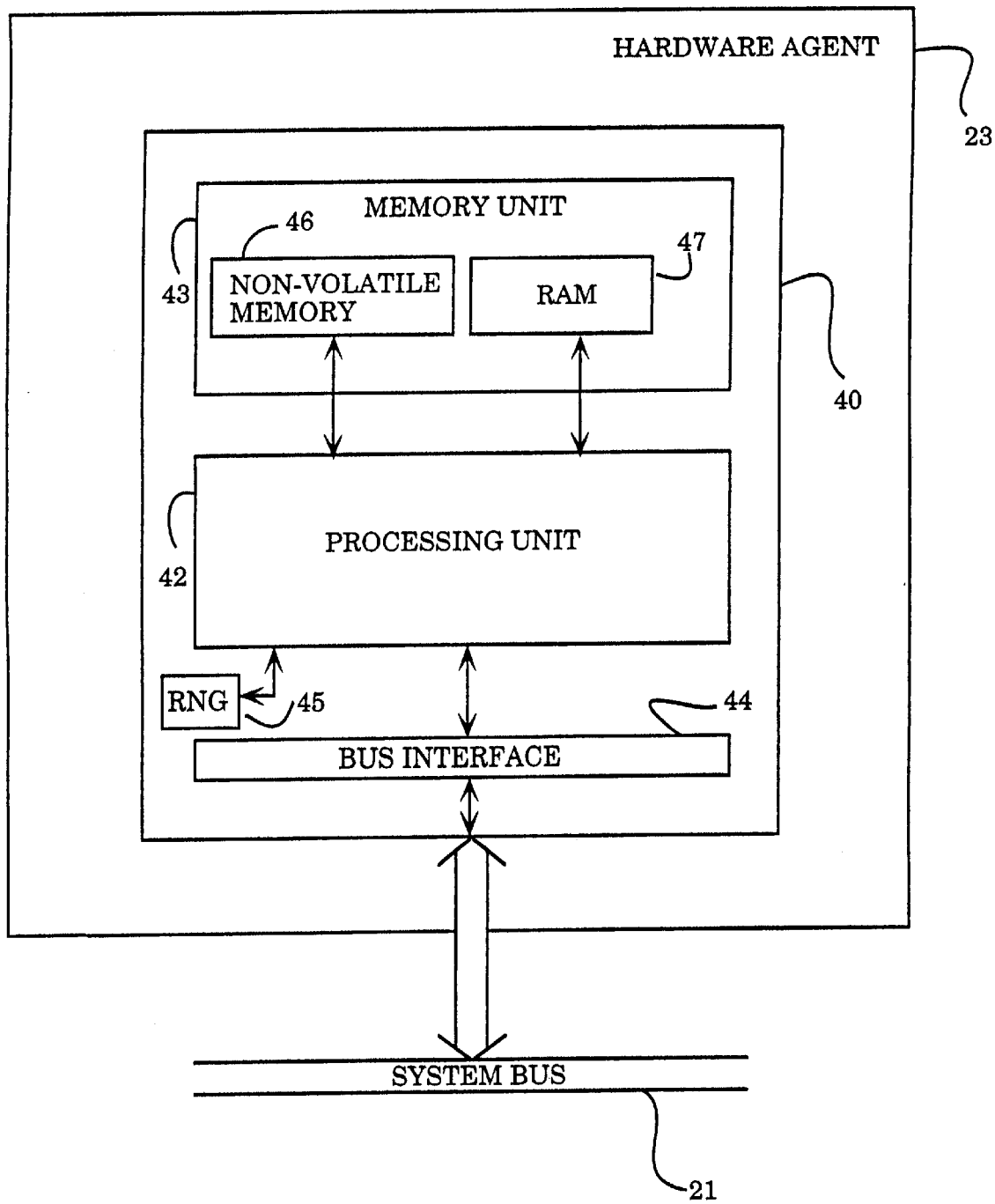
FIG. 5 is a block diagram of an embodiment of the present invention.

Referring now to an embodiment of the present invention as shown in FIG. 5, the hardware agent 23 is coupled to the system bus 21 to establish a communication path with the host processor 22. The hardware agent 23 comprises a single integrated circuit in the form of a die 40 (e.g., a microcontroller) encapsulated within a semiconductor device package 41, preferably hermetically, to protect the die 40 from damage and harmful contaminants. Of course, multiple dice may be used in lieu of a single die implementation shown herein for illustration purposes. In the example, the die 40 comprises a processing unit 42 coupled to a memory unit 43, a bus interface 44 and a number generator 45. The bus interface 44 enables communication between the hardware agent 23 and another device (e.g., the host processor 22). The processing unit 42 performs computations internally within a secured environment within the die 40 to confirm a valid connection with an authorized receiver. Such computations include executing certain algorithms and protocols, activating circuitry (e.g., the number generator 45 being preferably random in nature) for generating a device-specific public/private key pair and the like. The processing unit 42 is placed within the die 40 to prevent access of the private key through virus attack, which is a common method of disrupting a computer system to obtain its private key.

The memory unit 43 includes a non-volatile memory element 46 which stores the public/private key pair and at least one digital certificate therein. This non-volatile memory 46 is used primarily because it retains its contents when supply power is discontinued. The memory unit 43 further includes random access memory ("RAM") 47 in order to store certain results from the processing unit 42 and appropriate algorithms.

Although the hardware agent 23 is implemented as a peripheral device on the system bus 21 for greater security, it is contemplated that the hardware agent 23 could be implemented in several other ways at the PC platform level such as, for example, as a disk controller or PCMCIA card to automatically decrypt and/or encrypt information being inputted and outputted from a hard disk. Another alternative implementation would be for the hardware agent 23 to be one component of a multi-chip module including the host processor 22 as discussed below. Furthermore, even though the hardware agent 23 is described in connection with PC platforms, it is contemplated that such hardware agent 23 could be implemented within any input/output ("I/O") peripheral device such as within a fax machine, printer and the like or on a communication path between a computer and the I/O peripheral device.

Figure 6:
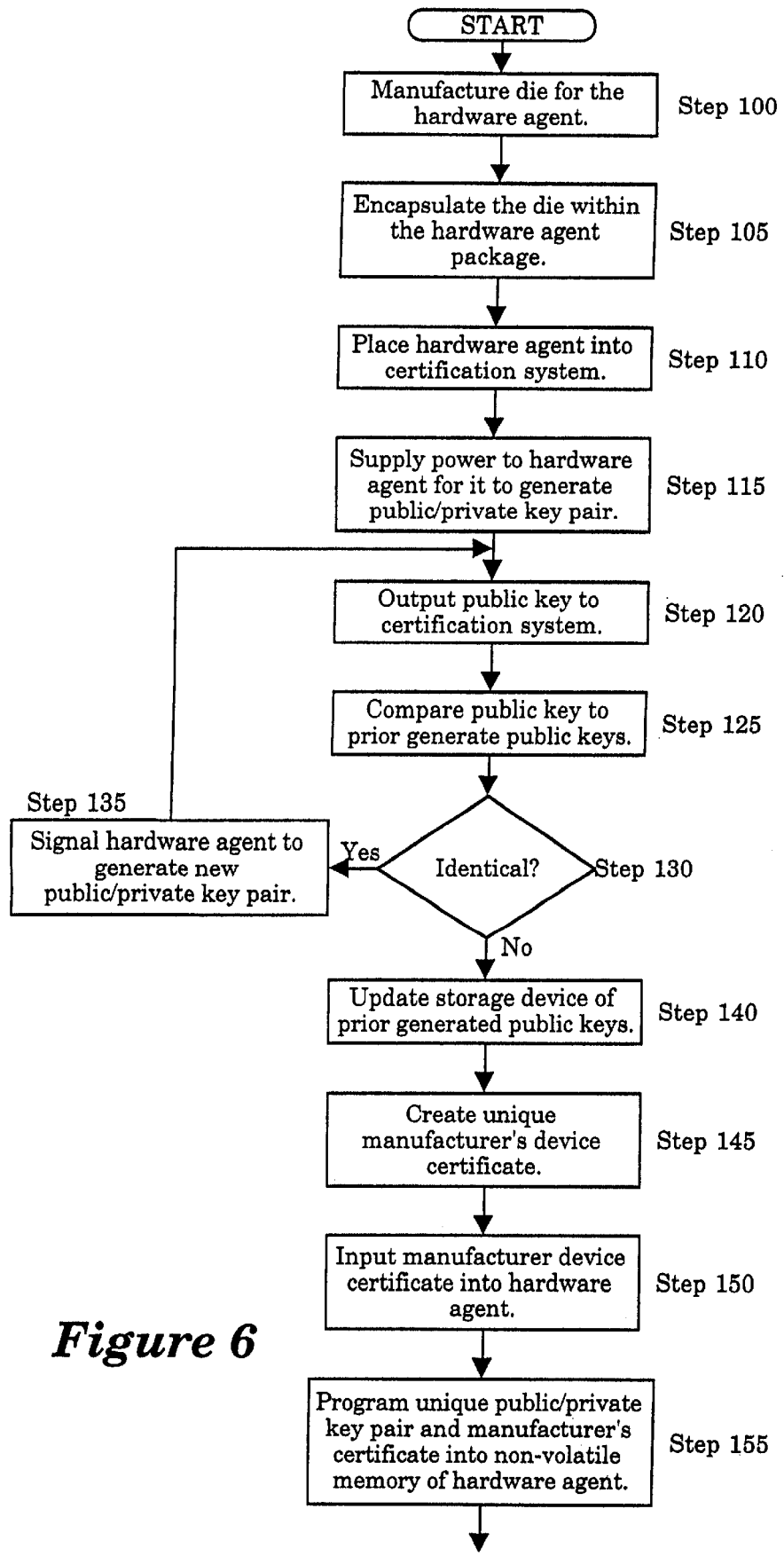
FIG. 6 is a flowchart illustrating the method for implementing a key pair and digital certificate into a semiconductor device.

Referring to FIG. 6, a flowchart of the operations for manufacturing the present invention is illustrated. First, in block 100, the die of the hardware agent is manufactured according to any conventional well-known semiconductor manufacturing technique. Next, the die is encapsulated within a semiconductor package so as to form the hardware agent itself (block 105). The hardware agent is placed onto a certification system which establishes an electrical connection to the hardware agent and the certification system (block 110). The certification system is basically a carrier coupled to a printed circuit board for generating and receiving electrical signals for certification of the hardware agent. The certification system includes a device for storage of prior generated public keys (e.g., a database) to guarantee unique key generation. Thereafter, the certification system supplies power to the hardware agent initiating a configuration sequence. During this sequence, the random number generator generates a device-specific public/private key pair internally within the hardware agent (block 115).

The public key of the public/private key pair is output to the certification system (block 120) where it is compared to the storage device of the prior generated public keys from previously manufactured hardware agents (block 125). In the highly unlikely event that the public key is identical to a prior generated public key (block 130), the hardware agent is signaled by the certification system to generate another such public/private key pair (block 135) and continue process at block 120. This process ensures that each public/private key pair is unique. The storage device for prior generated public keys is updated with this new, unique public key (block 140). Thereafter, in block 145, the certification system creates a unique device certificate by "digitally signing" the public key with the manufacturer's secret private key (i.e. in general terms, encrypting the public key with the manufacturer's private key). This certificate is input to the hardware agent (block 150) and the hardware agent permanently programs the unique public/private key pair and the device certificate into its non-volatile memory (block 155). At this point, the device is physically unique and is now capable of proving its authenticity.

Figure 7:
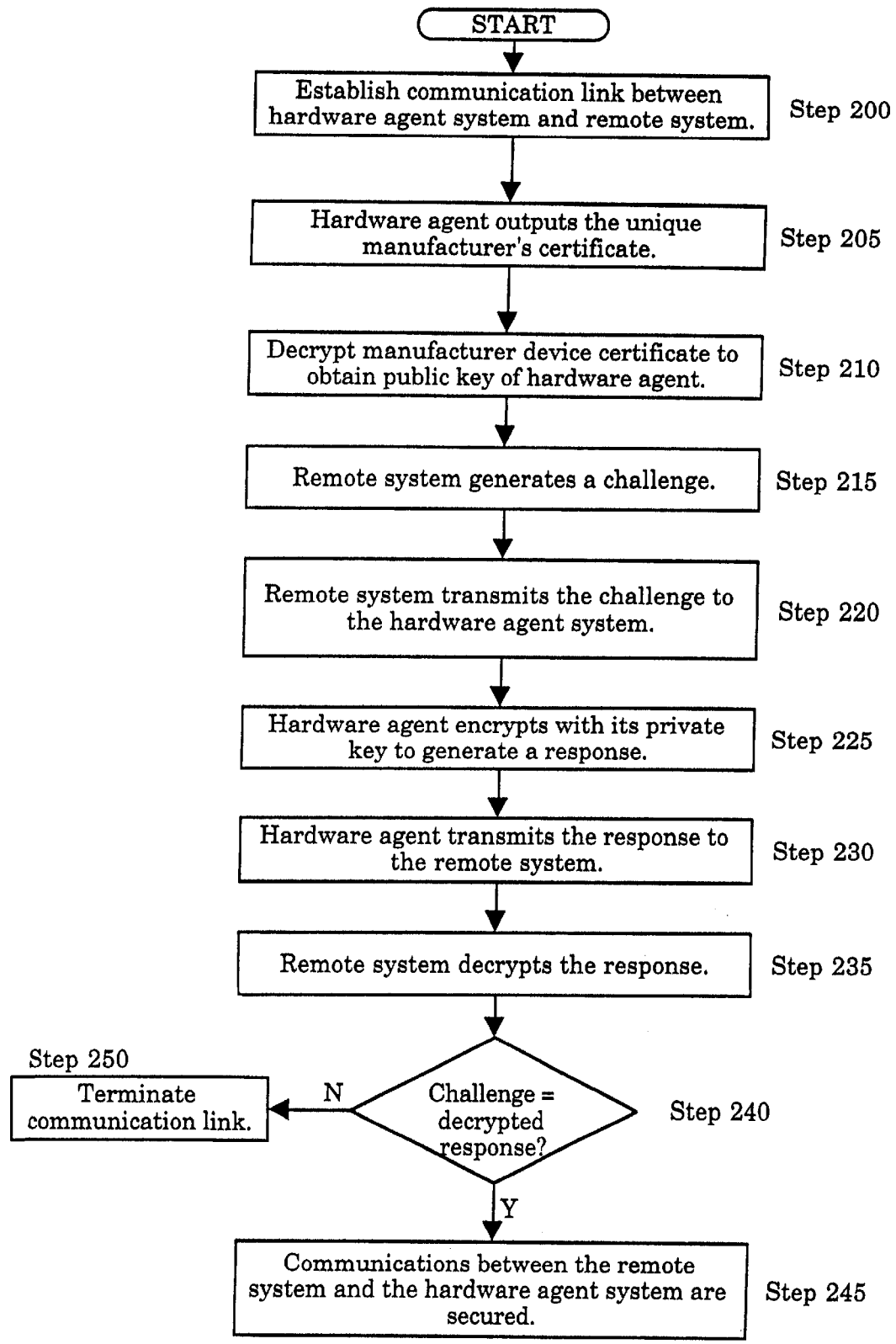
FIG. 7 is a flowchart illustrating the operations of the hardware agent.

Referring to FIG. 7, a flowchart of remote verification of a hardware agent is illustrated. In block 200, a communication link is established between a system incorporating the hardware agent ("hardware agent system") and a remote system (e.g., a system incorporating another hardware agent or running software which communicates with the hardware agent). The hardware agent outputs its unique device certificate to the remote system (block 205). Since the manufacturer's public key will be published and widely available, the remote system decrypts the device certificate to obtain the public key of the hardware agent (block 210).

Thereafter, in block 215, the remote system generates a random challenge (i.e., a data sequence for testing purposes) and transmits the random challenge to the local system (block 220). In block 225, the hardware agent generates a response (e.g., encrypts the challenge with the private key of the hardware agent) and transmits the response to the remote system (block 230). Then, the remote system decrypts the response with the public key of the hardware agent as previously determined from the device certificate transmitted by the hardware agent (block 235). In block 240, the remote system compares the original challenge to the decrypted response and if identical, communications between the system and the remote system are secure and maintained (block 245). Otherwise, the communications are terminated (block 250). At this point, the remote system is ensured that it is in direct contact with a specific device (of known characteristics) manufactured by a specific manufacturer. The remote system can now direct the hardware agent to perform specific functions within the target system on the remote's behalf. The integrity of these functions and secrecy of the associated data are ensured. Such functions may include receipt and use of content distribution keys, maintenance of accounting information, etc.

With the emergence of content distribution along, with other information providing devices, it may become necessary to provide additional assurances that the hardware agent is not a forgery. This can be accomplished by sending hardware agent to a reputable third party entity such as another trusted authority e.g., governmental agency, bank, trade association and the like. In a manner identical to that described above, a unique third party digital certificate of the third party entity (the "second level certificate") is input to the hardware agent. Thereafter, the hardware agent permanently programs the second level certificate accompanied by the public/private key pair and possibly the device certificate into its non-volatile memory. As a result, the hardware agent is validated through both the device certificate and the second level certificate to guarantee validity of the hardware agent and prevent fraudulent manufacture of the hardware agent, barring unlikely collusion by the third party entity and the manufacturer of the hardware agent.

Figure 8:
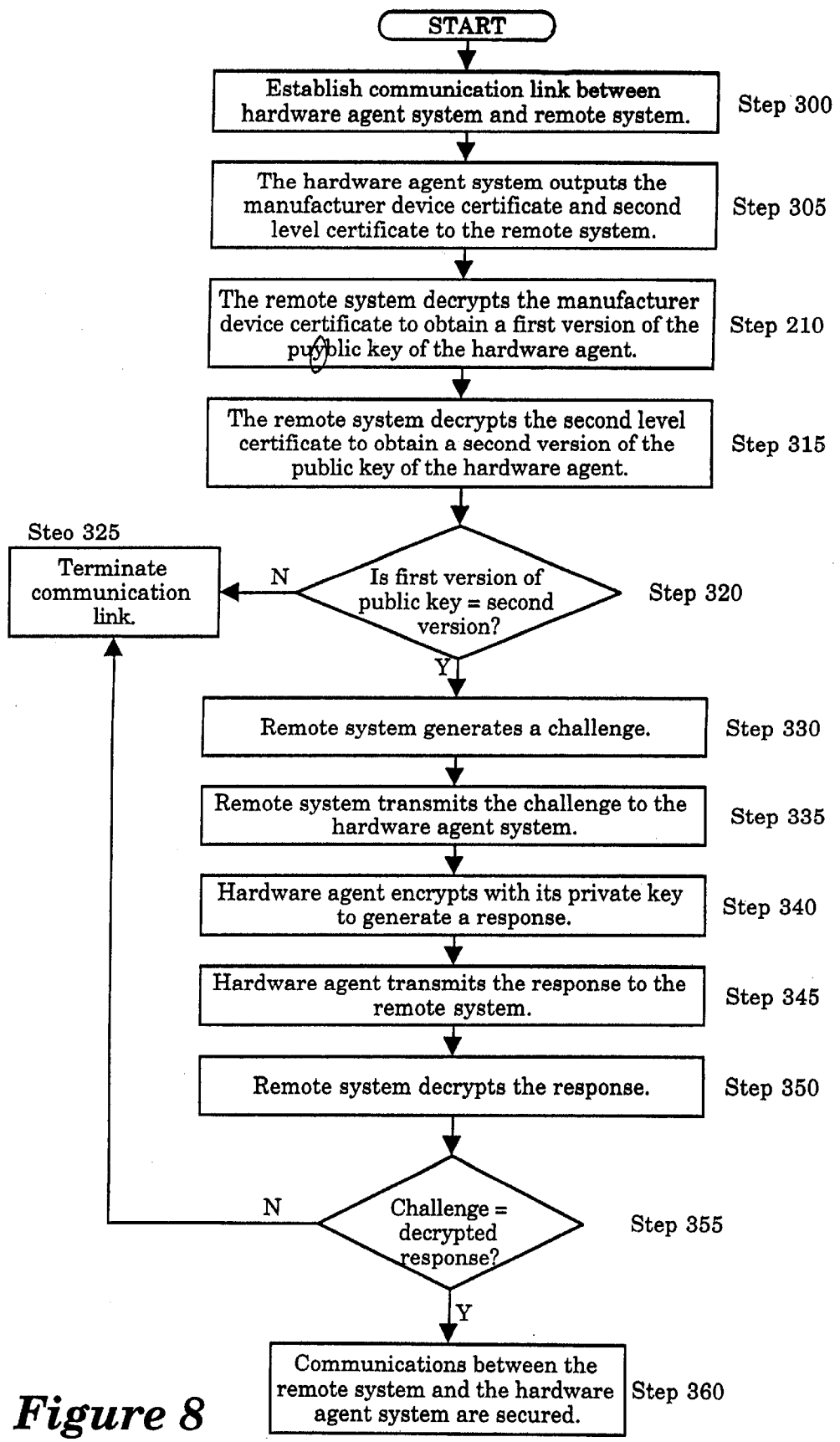
FIG. 8 is a flowchart illustrating remote verification of the hardware agent using second level certification.

Referring to FIG. 8, a flowchart of remote verification of a hardware agent including authentication using a second level certificate is illustrated. In block 300, a communication link is established between the local system and the remote system. The hardware agent outputs its unique device certificate and the second level certificate to the remote system (block 305). Next, the remote system decrypts the device certificate using the manufacturer's published public key to obtain the public key of the hardware agent (block 310). Similarly, the remote system decrypts the second level certificate using a well-published public key of the third party to obtain the public key of the hardware agent stored therein (block 315).

Thereafter, the two versions of the public key of the hardware agent are compared (block 320) and if the two versions are not identical, communication is terminated (block 325). However, if the two versions are identical, the remote system generates a random challenge and transmits the random challenge to the hardware agent (block 330). The hardware agent generates a response, for example, the challenge encrypted with the private key of the hardware agent (block 335), and transmits the response to the remote system (block 340). The remote system then decrypts the response with the public key of the hardware agent previously transmitted by the hardware agent (block 345). As in block 350, the remote system compares the original challenge to the decrypted response and if identical, communications between the system and the remote system are secure and maintained (block 355). Otherwise, the communications are terminated (block 360).

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A method for ensuring secured communications between a system employing a hardware agent and a remote system, the method comprising:
   establishing a communication link between the hardware agent and the remote system;
   transmitting a message from the remote system to the system;
   outputting a unique digital certificate from the system to the remote system;
   returning a response to the message, the response encrypted with a private key associated with the hardware agent;
   decrypting the digital certificate to obtain a public key associated with the hardware agent;
   decrypting the response with the public key associated with the hardware agent; and
   maintaining communications if the response is identical to that expected by the remote system.

2. The method of claim 1 wherein the unique digital certificate comprises a device certificate.

3. The method of claim 1 wherein the digital certificate comprises a second level certificate.

4. The method of claim 1 wherein the method further comprises terminating communications if the response received from the system differs from that expected by the remote system.

5. The method of claim 1 wherein the message includes a random data sequence.

6. The method of claim 1 wherein the method further includes transmission of additional key data between the system and the remote system.

7. A method for ensuring secured communications between a system employing a hardware agent and a remote system, the method comprising:
   establishing a communication link between the hardware agent and the remote system;
   outputting a unique digital certificate from the system to the remote system;
   decrypting the digital certificate to obtain a public key associated with the hardware agent;
   transmitting a message from the remote system to the system;
   returning a response to the message, the response encrypted with a private key associated with the hardware agent;
   decrypting the response with the public key associated with the hardware agent; and
   maintaining communications if the response is identical to that expected by the remote system.

8. The method of claim 7 wherein the unique digital certificate comprises a device certificate.

9. The method of claim 7 wherein the unique digital certificate comprises a second level certificate.

10. The method of claim 7 wherein the method further comprises terminating communications if the response received from the system differs from that expected by the remote system.

11. The method of claim 7 wherein the message includes a random data sequence.

12. The method of claim 7 wherein the method further includes transmission of additional key data between the system and the remote system.

13. A method to provide reliable electronic distribution of information between a first system and a second system remotely located from the first system coupled together by a communication link, the method comprising:
   storing a public key, a private key, and signed key parameters in a semiconductor device associated with the first system;
   outputting the signed key parameters from the semiconductor device to the second system via the communication link;
   authenticating the first system by the second system; and
   transmitting the information from the second system to the first system provided the first system is authenticated.

14. The method of claim 13 wherein the signed key parameters comprise a unique digital certificate.

15. The method of claim 14 wherein the digital certificate comprises a device certificate.

16. The method of claim 14 wherein the digital certificate comprises a second level certificate.

17. The method of claim 13 wherein the method further comprises transmitting of additional key data between the system and the remote system.

18. The method of claim 13 wherein the signed key parameters are signed with the private key.

19. The method of claim 18 wherein the signed key parameters comprise a unique digital certificate.

20. The method of claim 19 wherein the unique digital certificate comprises a device certificate.

21. The method of claim 19 wherein the digital certificate comprises a second level certificate.

22. A method comprising:
   establishing a communication link between a first system employing a hardware agent and a second system remotely located from the first system;
   receiving a unique digital certificate from the first system by the second system;
   recovering a public key associated with the hardware agent from the unique digital certificate;
   outputting a message from the second system to the first system;
   receiving a response to the message, the response being encrypted with a private key associated with the hardware agent;
   decrypting the response with the public key associated with the hardware agent; and
   maintaining communications if the response is identical to that expected by the second system.

23. The method of claim 22 wherein the unique digital certificate comprises a device certificate.

24. The method of claim 22 wherein the unique digital certificate comprises a second level certificate.

25. The method of claim 22 further comprising terminating communications if the response received from the first system differs from that expected by the second system.

26. The method of claim 22 wherein the message includes a random data sequence.

27. The method of claim 22 further comprising transmitting additional key data between the first system and the second system.

* * * * *

UNITED STATES PATENT AND TRADEMARK OFFICE
CERTIFICATE OF CORRECTION

PATENT NO.    : 6,292,892 B1
DATED         : September 18, 2001
INVENTOR(S)   : Davis It is certified that error appears in the above-identified patent and that said Letters Patent is hereby corrected as shown below:

Column 5,
Line 58, delete "hardware agent system" second occurrence insert -- local system --.

Drawings,
Figure 6, missing "END" see attached Figure 6.

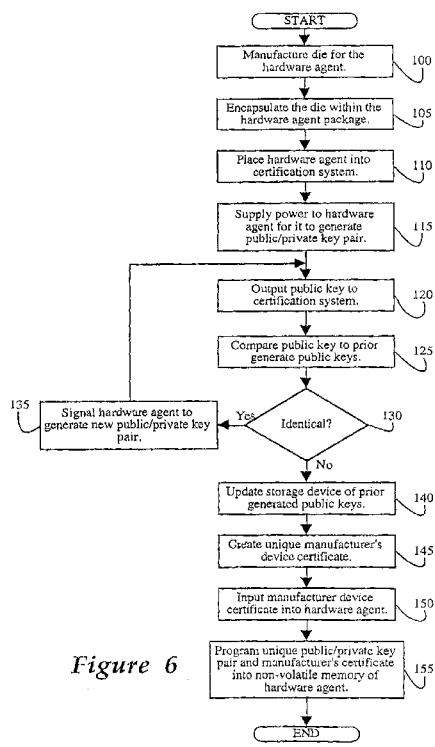

Figure 6

Signed and Sealed this

Twenty-fifth Day of June, 2002

*Attest:*

*Attesting Officer*

JAMES E. ROGAN
*Director of the United States Patent and Trademark Office*